Nov. 28, 1961 R. W. KETCHLEDGE 3,011,150

SIGNAL COMPARISON SYSTEM

Filed April 27, 1956 2 Sheets-Sheet 1

INVENTOR
R. W. KETCHLEDGE
BY
ATTORNEY

Nov. 28, 1961 R. W. KETCHLEDGE 3,011,150

SIGNAL COMPARISON SYSTEM

Filed April 27, 1956 2 Sheets-Sheet 2

INVENTOR
R. W. KETCHLEDGE
BY
[signature]
ATTORNEY 3,011,150

SIGNAL COMPARISON SYSTEM

Raymond W. Ketchledge, Whippany, N.J., assignor to Bell Telephone Laboratories, Incorporated, New York, N.Y., a corporation of New York Filed Apr. 27, 1956, Ser. No. 581,174
16 Claims. (Cl. 340—149)

Figure 1:
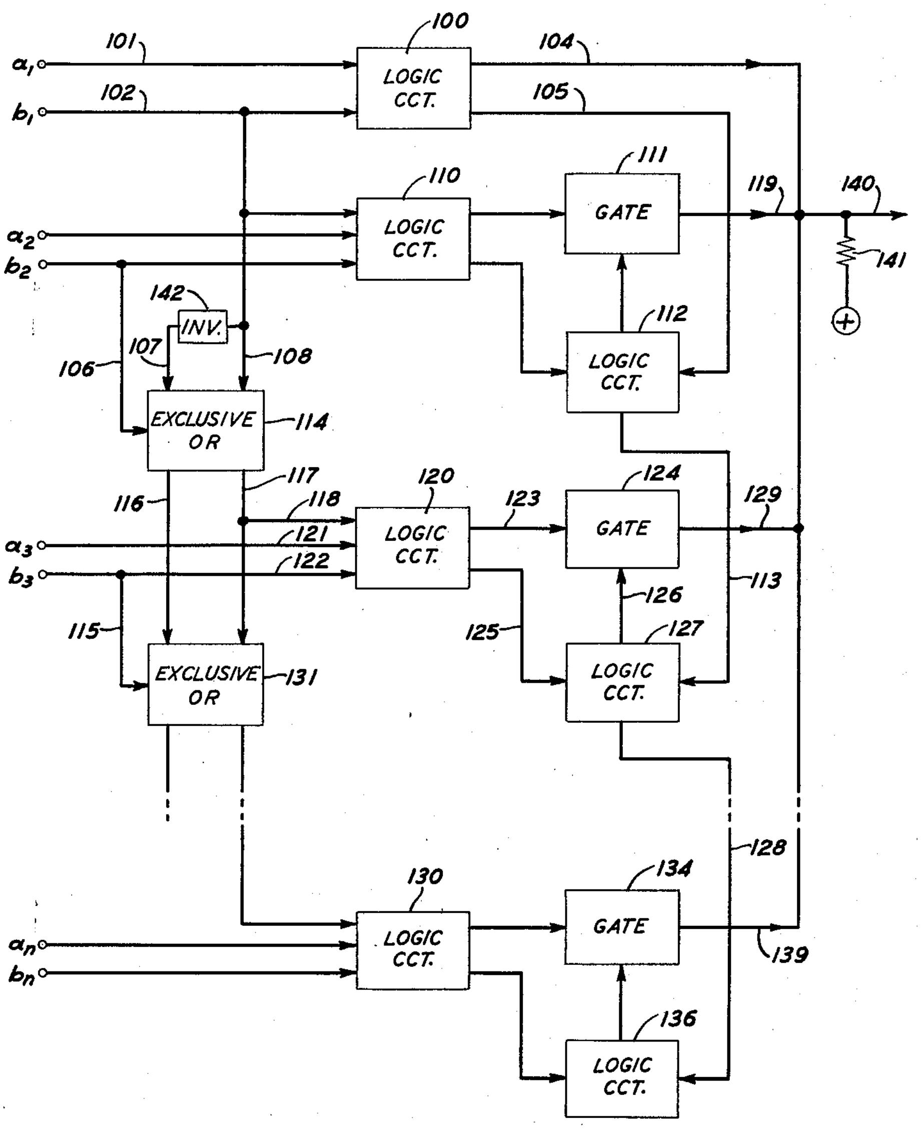

This invention relates to electrical signal comparison systems and, more particularly, to systems for comparing binary code signals.

The invention may be exemplified in its practical application in systems employing binary codes; that is systems in which a code group consists of a numerical sequence of any number of 0's or 1's in any permutation arrangement. Therefore, any individual element of such a code consists of a 0 or 1. These 0 and 1 elements may be differentiated from each other in practical arrangements by conditions of current and no current, positive current and negative current, or by other pairs of suitable conditions.

The prior art offers systems and methods of checking the accuracy of received or recorded binary code combinations or numbers. Systems for changing from one code form such as the conventional binary code, a code following the binary scale of notation, into another code form, such as the reflected binary code described in the patent of F. Gray, No. 2,632,058, issued March 17, 1953, are also known in the art. However, it is also desirable to be able to compare multi-digit binary code numbers to procure an indication of the equality of the compared numbers and if unequal the larger of the compared numbers. Such comparison means may find practical application in beam positioning systems such as that disclosed in the application of C. W. Hoover, Jr. and R. W. Ketchledge, Serial No. 581,073, filed April 27, 1956, now Patent No. 2,855,540, issued October 7, 1958. In this system a cathode ray tube beam is given a ribbonlike configuration and deflected by signals formed from a binary code input number to a particular row of apertures in a binary code plate. Electrons passing through the code plate are picked up on target electrodes to form a binary code number in parallel form. Comparison of the input binary number with the output binary number in the instant circuit determines the accuracy of initial positioning. An output signal from the comparison circuit may be fed back to the tube deflection plates for repositioning. Such a combination tube and comparison circuit may act as a monitor for storage devices such as the barrier grid store disclosed in the patent of R. W. Sears, No. 2,675,499, issued April 13, 1954.

Such a comparison system may also find application in the feedback positioning circuit of the flying spot store disclosed in the application of R. C. Davis and R. E. Staehler, Serial No. 541,195, filed October 18, 1955, now Patent No. 2,830,285, issued April 8, 1958, and particularly in the feedback positioning circuit for a flying spot store as disclosed by C. W. Hoover, Jr. in his application Serial No. 581,072, filed April 27, 1956, now Patent No. 2,855,539, issued October 7, 1958. In the system of the Hoover application a light beam formed in a ribbonlike configuration is positioned by elements driven by an input address binary number on a binary code positioning slide. A battery of photocells is arranged to receive light through this slide and form a binary code output number. Passing both input and output numbers into the instant comparison circuit results in output signals to drive the deflection system so as to drive the light beam in one of two directions.

Such a comparison of binary numbers may also be employed to advantage in pulse code modulation systems and in positioning systems utilizing a monitor cathode ray tube to control the positioning of a beam in a storage or other cathode ray device.

It is an object of this invention to provide a binary number comparison system.

It is another object of this invention to compare two binary numbers of the same order and to provide one of two output characteristics dependent upon the larger of the compared numbers.

It is another object of this invention to compare two binary numbers of the reflected binary code form so as to provide one of two output characteristics dependent upon the larger of the compared numbers.

It is another object of this invention to improve the operation of a reflected binary code number comparator. It is a more specific object of this invention to combine several logic operations of the comparator.

The above objects are attained in accordance with the invention by the application to the comparator network of each of the various digits of a first binary number as one of two electrical signals, each digit being allotted a distinct input in one of several stages of the comparator network. The digit significance, as utilized hereinafter, refers to the relative position or order of a digit in a binary number. Thus, for example, the most significant digit refers to that digit appearing in the first position or highest order of the number. Similarly, digits of the same significance in two numbers indicate like ordered digits or digits in the same position in the numbers. Each of the various digits of a second binary number to be compared with the first binary number is applied to another input in the same stage as the corresponding digit in significance of the former number. Thus, the most significant digit in each binary number is applied to one stage of the comparator via separate input leads, succeeding digits of lesser significance being applied to other stages thereof in similar fashion. The various stages are interconnected in common to a single output from the comparator which output in turn provides one of two electrical signals dependent upon the results of the binary number comparisons.

In accordance with the illustrative embodiment of this invention, each stage of the comparator contains a series of logic circuits. Such circuits in general comprise elements arranged to perform a logical operation on numbers received at a plurality of inputs in the form of electrical signals and providing electrical signals on one or more outputs to indicate the result of the logical operation. The arrangement in this illustrative embodiment of this invention is such that each digit of one reflected binary code number is compared with its counterpart in a second reflected binary code number in a unique logic circuit, one output of each such logic circuit being connected in common to the final output which provides one of two distinctive electrical signals to external connections, dependent upon the larger of the two input numbers. A second output of each logic circuit is connected to the logic circuit comparing the next less significant digits of the input numbers and serves to prevent the latter circuits from changing particular electrical signals on the final output lead established by logic circuits comparing signals representing input digits of greater significance.

In addition to the two digit inputs to each such logic circuit, a third input is provided which permits the reversal of the signals on the two output leads therefrom when the number of more significant digits of one kind, i.e., "one" or "zero" in one of the reflected binary code input numbers, is odd. A second type of logic circuit is provided for each pair of digits compared to form the proper input signal on this third input lead.

This circuit arrangement permits the comparison of two reflected binary numbers digit-by-digit, such that the most significant digit comparison which yields a resultant indicating that one of the compared digits is larger than the other, will establish the resultant output signal, the resultants of succeeding comparisons of digits of lesser significance being blocked. The comparison yielding the output signal also depends upon the number of digits of one type in one of the input reflected binary numbers preceding the compared digits.

It is a feature of this invention that two reflected binary code numbers be applied to a series of logic circuits and a selected one of a plurality of possible signals indicative of the larger of the two reflected binary code numbers be derived at a common output.

It is a more specific feature of this invention that corresponding digits of two reflected binary code numbers to be compared be applied to input logic circuits and a selected one of a plurality of possible signals indicative of the larger of the two reflected binary code numbers be derived at a common output of the several input logic circuits.

It is another feature of this invention that two reflected binary code numbers be compared digit-by-digit in individual logic circuits such that the most significant digit comparison yielding a resultant signal indicating disparity between the compared digits will establish the final output signal and override the resultant signals of all lesser significance digit comparisons.

It is another feature of this invention that individual signals be applied to each digit comparison circuit, in addition to the digit signals, indicating the odd or even character of the digit signals from preceding digits of one of the compared binary numbers.

It is another feature of this invention that the comparison circuit comprise means to provide a first signal on one output lead and a second signal on another output lead indicative of a disparity between the input digit signals, to provide no output signal on application of like digit signals, and to reverse the output signals upon application of an input signal other than the digit signals.

Figure 2:
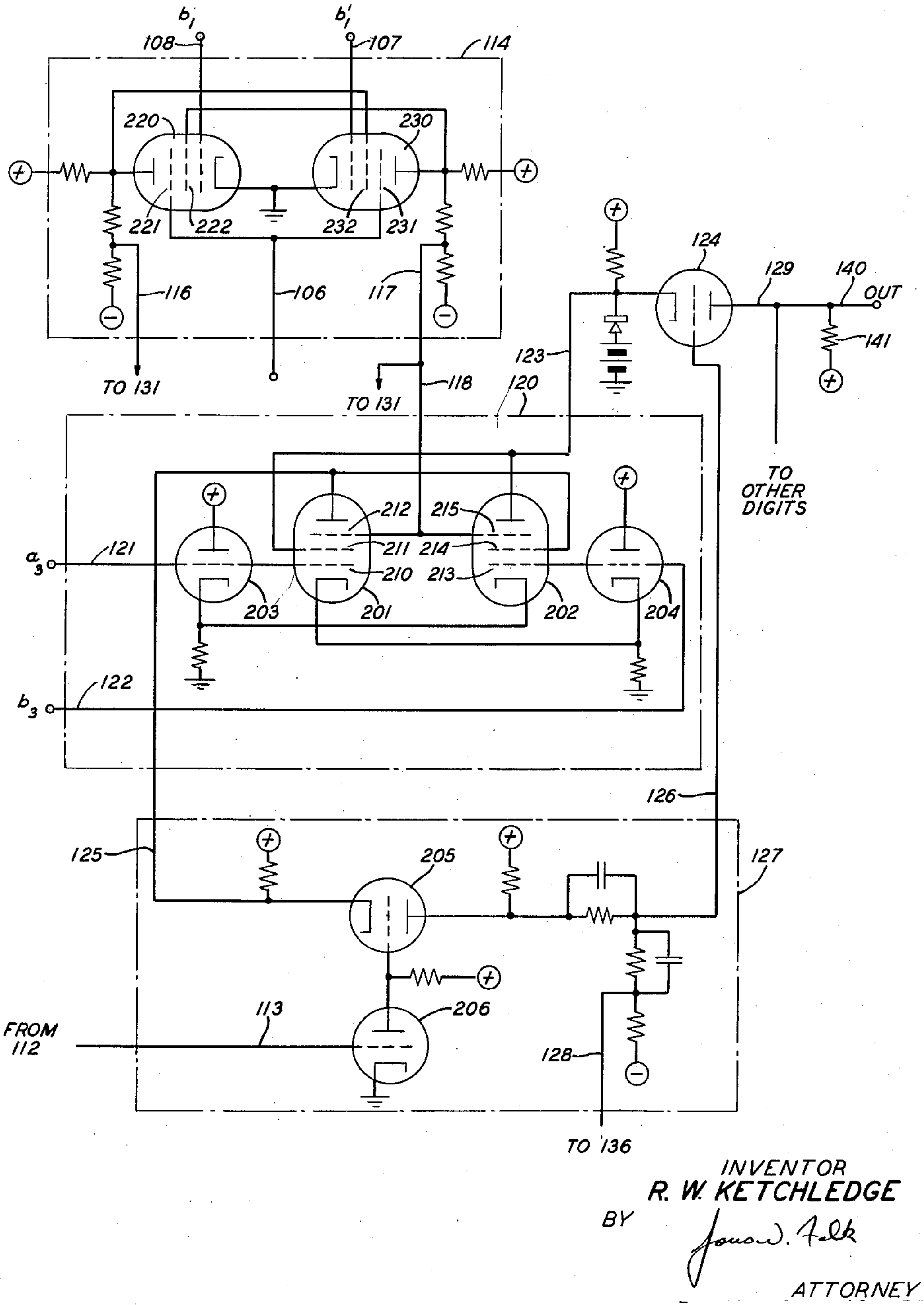

A complete understanding of this invention and of these and various other features thereof may be gained from consideration of the following detailed description and the accompanying drawing in which:

FIG. 1 is a diagrammatic representation of one specific embodiment of this invention; and FIG. 2 is a simplified circuit schematic of a portion of the embodiment of FIG. 1.

Referring now to the drawing, FIG. 1 depicts an illustrative embodiment of this invention utilizing an arrangement of logic circuits to compare the reflected binary code number $a_1a_2a_3 \ldots a_n$ with the reflected binary code number $b_1b_2b_3 \ldots b_n$. The most significant digits $a_1$ and $b_1$ of the two numbers are applied as selected ones of two discrete voltage levels on input leads 101 and 102, respectively, of the logic circuit 100. The two discrete input voltage levels represent the binary digits "one" and "zero" and the explanation hereinafter will allude to the condition of the circuit in terms of the presence of a "one" or a "zero." Logic circuit 100 will provide an output "one" on lead 104 and an output "zero" on lead 105 when an input "one" is present on lead 101 and an input "zero" is present on lead 102. With the input signals reversed, i.e., a "zero" on lead 101 and a "one" on lead 102, the output signals on leads 104 and 105 will be reversed, i.e., a "zero" will appear at lead 104 and a "one" at lead 105. When like signals are applied to the input leads 101 and 102, no output signals appear on the output leads. Accordingly, the logical function of the logic circuit 100 is to repeat the input signals on specific output leads if the input signals are unalike but to, in effect, ignore the input signals if they are alike, having no output on the output leads.

The mathematics of my invention and the logical operation of this logic circuit, as discussed herein, both enable a ternary operation in which the circuit can compare two numbers in reflected binary code and distinguish between the three possible conditions of one number being larger than the other, smaller than the other, or both numbers equal. In most applications, however, as when one number is kept constant and the other number is tracked to vary by one digit each time, which may be done in beam servoing systems, it is sufficient merely to recognize two states, e.g., that one number is smaller than the other or that one number is equal to or greater than the other. In such systems the transition from smaller than to equal to or greater than is readily noted. Accordingly, in certain specific illustrative embodiments of this invention only two final output signals occur. In the specific illustrative embodiment described herein one possible input signal is a negative voltage; the other possible input signal is ground. Accordingly, the outputs of logic circuit 100 will be conduction and nonconduction; nonconduction and conduction; or nonconduction over both leads 104 and 105, indicating no signals, when the inputs are the same.

Thus in circuit 100 a simple digital comparison is achieved, indicating by selected ones of two output signals the character of the two input digits. The output from logic circuit 100 over lead 105 serves to prepare the succeeding comparison circuits to block or pass signals to the output lead 140 indicative of the digital comparisons conducted therein. Thus a selected one of two output signals from one digital comparison circuit to the external connection is preserved, despite the resultant of any less significant digit comparison.

Additionally, signals are provided to subsequent logic circuits 110, 120 and 130, respectively, indicating whether or not the preceding group of more significant digits of only one of the input binary numbers collectively contains an odd number of "ones." In this specific embodiment the odd number of "ones" of the second or "*b*" number is utilized. Accordingly, lead 102 is applied directly as an input to logic circuit 110 and inputs indicating the sum of the preceding ones are applied to the subsequent logic circuits 120, 130 . . . through circuits 114, 131. These circuits sum the number of "ones" on the prior "*b*" input leads and apply a "one" to the logic circuits if that total is odd. It should be noted that in this specific embodiment these circuits have two inputs, representing the sum and the inverse or prime of the sum of the preceding "*b*" digits; accordingly an inverter 142 is connected to lead 108 so that the other input 107 of circuit 114 is the prime or inverse of the signal on lead 102. If the number of preceding "ones" is not odd, the operation of the logic circuit involved is undisturbed; i.e., proceeding in the manner described hereinbefore for logic circuit 100; but if the number of preceding "ones" is odd, the operation of the logic circuit involved is reversed.

Assume, for example, that circuit 114 finds an odd number of "ones" present in the group of more significant digits of number $b_1b_2b_3 \ldots b_n$; viz, $b_1$ is a "one" and $b_2$ is a "zero," $b_1$ and $b_2$ being the only more significant digits in this instance. Circuit 114 in this instance will provide a signal to circuit 120 which is effective to reverse the normal outputs on leads 123 and 125 due to comparison of digits $a_3$ and $b_3$.

The results obtained are readily apparent from a consideration of Tables I and II included hereinafter. Table I shows a digit-by-digit comparison of two three-digit reflected binary code numbers. A three-digit code is employed merely for purposes of illustration as reflected binary code numbers containing any number of digits can be compared in this embodiment of this invention. In Table I a "zero" in the resultant represents like corresponding digits in the compared numbers "*a*" and "*b*." A plus sign in the resultant indicates that the "*a*" digit is larger than the corresponding "*b*" digit, and a negative sign indicates the reverse situation. It is noted that on the diagonal in Table I the resultants are all "zeroes" indicating that the compared numbers producing these resultants are identical. In this form, however, the resultants afford no apparent means for distinguishing which of two unequal compared numbers is the larger.

*Table I*

| Dec. No. | $a_1a_2a_3$ / $b_1b_2b_3$ | 7<br>100 | 6<br>101 | 5<br>111 | 4<br>110 | 3<br>010 | 2<br>011 | 1<br>001 | 0<br>000 |
|---|---|---|---|---|---|---|---|---|---|
| 7 | 100 | 000 | 00+ | 0++ | 0+0 | −+0 | −++ | −0+ | −00 |
| 6 | 101 | 00− | 000 | 0+0 | 0+− | −+− | −+0 | −00 | −0− |
| 5 | 111 | 0−− | 0−0 | 000 | 00− | −0− | −00 | −−0 | −−− |
| 4 | 110 | 0−0 | 0−+ | 00+ | 000 | −00 | −0+ | −−+ | −−0 |
| 3 | 010 | +−0 | +−+ | +0+ | +00 | 000 | 00+ | 0−+ | 0−0 |
| 2 | 011 | +−− | +−0 | +00 | +0− | 00− | 000 | 0−0 | 0−− |
| 1 | 001 | +0− | +00 | ++0 | ++− | 0+− | 0+0 | 000 | 00− |
| 0 | 000 | +00 | +0+ | +++ | ++0 | 0+0 | 0++ | 00+ | 000 |

Table II illustrates the resultants of Table I with the plus or minus sign of a position reversed if an odd number of "ones" appears in more significant digit positions of the "*a*" number.

*Table II*

| Dec. No. | $a_1a_2a_3$ / $b_1b_2b_3$ | 7<br>100 | 6<br>101 | 5<br>111 | 4<br>110 | 3<br>010 | 2<br>011 | 1<br>001 | 0<br>000 |
|---|---|---|---|---|---|---|---|---|---|
| 7 | 100 | 000 | 00− | 0−+ | 0−0 | −+0 | −+− | −0+ | −00 |
| 6 | 101 | 00+ | 000 | 0−0 | 0−− | −++ | −+0 | −00 | −0− |
| 5 | 111 | 0++ | 0+0 | 000 | 00− | −0+ | −00 | −−0 | −−− |
| 4 | 110 | 0+0 | 0+− | 00+ | 000 | −00 | −0− | −−+ | −−0 |
| 3 | 010 | ++0 | ++− | +0+ | +00 | 000 | 00− | 0−+ | 0−0 |
| 2 | 011 | +++ | ++0 | +00 | +0− | 00+ | 000 | 0−0 | 0−− |
| 1 | 001 | +0+ | +00 | +−0 | +−− | 0++ | 0+0 | 000 | 00− |
| 0 | 000 | +00 | +0+ | +−+ | +−0 | 0+0 | 0+− | 00+ | 000 |

Thus, comparing the "*a*" number 110 with the "*b*" number 101 produces the resultant 0+− in Table I. Since the number of "ones" preciding the second digit of the "*a*" number 110 is odd, the second position of the resultant is changed from a "plus" to a "minus." The number of "ones" preceding the third digit of the "*a*" number 110 is even so that the "minus" in the third position of the resultant is not disturbed. Thus, the revised resultant as shown in Table II is 0−−. Close analysis of Table II reveals that in all instances in which the "*a*" number is larger than the "*b*" number the first sign other than zero encountered in the resultant is a "plus." In all instances in which the "*b*" number is the larger, the first sign encountered in the resultant is a "minus."

It is possible, therefore, in accordance with this invention to provide an output signal corresponding to the first "minus" digit comparison resultant, a second signal corresponding to the first "plus" digit comparison resultant and a third signal representing a lack of either a "plus" or "minus" digit comparison resultant; i.e., a condition when all compared digits are equal and all zeroes appear in the resultant.

The circuit illustrated in this embodiment of this invention is arranged to provide a first distinctive output signal if the first digit comparison resultant other than zero is negative and a second distinctive output signal if the first digit comparison resultant other than zero is positive. When all corresponding digits of the compared numbers are the same, resulting in all zero comparisons, the resultant is interpreted consistently as one or the other of the two distinctive output signals. Such an arrangement is satisfactory for beam position servo systems in which the zero position of exact correspondence between the compared numbers is achieved on the transition from one of the two distinctive output signals to the other. The circuit may be modified to provide three distinctive output signals including a distinctive signal for the zero condition of correspondence if desired.

In order further to illustrate the operation of the circuit shown in FIG. 1, it will be assumed that the digits of reflected binary code number 1011 be placed on corresponding input leads $a_1a_2a_3a_n$ and digits of number 1001 on leads $b_1b_2b_3b_n$. It will also be assumed that the output of the previous comparison indicates a "plus" digit comparison resultant. The $a_1$ and $b_1$ inputs carrying "one" signals will leave the output of logic circuit 100 unchanged. The "one" signal on $b_1$ is also inserted in logic circuit 110 to indicate an odd number of preceding "ones" in the number $b_1b_2b_3b_n$. The $a_2$ and $b_2$ digits carrying "zero" signals in this example will leave the output of logic circuit 110 unchanged, and the $b_2$ digit as well as the $b_1$ digit will be inserted in circuit 114 over leads 106 and 108, respectively, resulting in an output on lead 117 indicating an odd number of "ones" in the preceding digits of the number $b_1b_2b_3b_n$.

A "one" on the $a_3$ digit lead and a "zero" on the $b_3$ digit lead provides a combination which when inserted in logic circuit 120 would normally produce a "plus" output signal on lead 123 and an opposite output signal on lead 125. The signal on lead 118, indicating an odd number of preceding "ones," will serve to reverse the normal output signals and provide a "minus" output signal on lead 123 which will be passed to the first output lead 140 serving to indicate that the $a_1a_2a_3a_n$ number is smaller than the $b_1b_2b_3b_n$ number. A "plus" signal is placed on lead 125 which serves to prevent output signals from less significant digit comparisons, in this case from the $a_nb_n$ comparison, from passing to the final output lead 140 to disturb the pre-established signal.

FIG. 2 is a simplified circuit schematic of a portion of the embodiment of FIG. 1. Circuit 120 in this specific embodiment comprises an arrangement of two pentode tubes 201 and 202 and two cathode followers 203 and 204 which performs both AND and OR logic plus selective switching of the OR logic. The ordinary pentode tube may be employed by removing the common connection between the cathode and suppressor grid. The control grid 210 of pentode 201 and the control grid of cathode follower 203 are commonly connected to the signal source $a_3$ over lead 121. Similarly, the control grid 213 of tube 202 and the control grid of cathode follower 204 are commonly connected to the signal source $b_3$ over lead 122. The cathodes of tubes 201 and 204 are commonly connected as are the cathodes of tubes 202 and 203.

Input signals may be represented by a selected one of two voltage levels. Thus, zero voltage may represent a "zero" input signal and a negative voltage may represent a "one" input signal.

Let us consider the operation of circuit 120 in a little more detail. If we assume that both input leads are at ground and take this as our normal operation, then both pentodes 201 and 202 are cut off. The cathode followers 203 and 204 are conducting at all times. Because of the cathode and grid cross connections, conduction in the cathode followers 203 and 204 raises the cathode potential of pentodes 201 and 202 sufficiently above ground so that, with ground potential at the control grids, both tubes are cut off. If now inputs are applied to circuit 120 such that $a_3=0$ and $b_3=1$, a negative voltage will be applied to tubes 202 and 204 while ground is applied to tubes 201 and 203. The negative pulse on the cathode follower 204 control grid decreases the potential at the cathode of pentode 201, causing that tube to conduct. At the same time the negative potential on the grid of tube 202 prevents conduction in that tube.

Similarly, with a negative voltage "one" signal on lead 121 and consequently on the control grids of tubes 201 and 203, conduction through tube 201 will decrease. The cathode follower action of tube 203 causes a more negative voltage on the cathode of tube 203 and thus on the cathode of tube 202 thereby increasing conduction through tube 202. A zero voltage "zero" signal on lead 122 at this time makes the grid of tube 202 less negative with respect to the cathode to further increase conduction therethrough. The "zero" signal on lead 122 also makes the cathode of tube 201 more positive further decreasing conduction therethrough.

Accordingly, with unlike signals on leads 121 and 122 conduction through one of the tubes 201 and 202 will occur and conduction through the other tube will be prevented. With like signals, such as negative voltages, on the two input leads, the effects described above will cancel each other out and no conduction will occur in either pentode. In this way the negative voltage on lead 122 causes a decrease in the cathode potential of tube 201 but the negative voltage on lead 121 causes a corresponding decrease in control grid 210 potential, thereby leaving the tube 201 in its prior nonconducting state.

If desired a small amount of conduction could always be present in pentodes 201 and 202 without changing the basic operation of the circuit, as described above.

The introduction of a negative voltage signal on lead 118, indicating an odd number of preceding "ones" digits in one of the compared numbers as described hereinbefore, makes the grids 212 and 215 of tubes 201 and 202 respectively sufficiently negative to divert substantially all of the current flow in a conducting tube from the plate to the screen grids 211 or 214. The screen grids and plate circuits of tubes 201 and 202 are mutually cross-connected so that a signal on lead 118 is effective to reverse the signal output paths of these tubes.

Conduction occurs in one or the other of the pentode output circuits 123 and 125 but not in both circuits simultaneously. Conduction over lead 123 makes the cathode in triode 124 more negative, causing increased conduction over lead 129, and a consequent increase in voltage drop across resistor 141 so as to impress a discrete voltage signal on output lead 140. Lack of conduction over lead 123 results in substantial cutoff of tube 124 and a consequent more positive "no current" discrete voltage signal on output lead 140. Simultaneously with production of the latter output signal, conduction over lead 125 makes the cathode of triode 205 more negative increasing conduction therethrough and thereby making the grid voltage of tube 124 more negative to assure cutoff of that tube and providing a negative "no current" voltage signal on lead 128.

A negative voltage signal on lead 113 from circuit 112 indicative of a "no current" or high output signal voltage level produced by a preceding comparison circuit, cuts off triode 206. The voltage on the grid of tube 205 is made more positive thereby, insuring conduction through tube 205 and making the grid of tube 124 more negative. Tube 124 thus is cut off if lead 113 has a negative voltage signal thereon assuring that the "no current" signal impressed on the final output lead 140 by one of the prior digit comparisons is not disturbed by a "current" signal of a lesser significance comparison. The negative voltage signal is also impressed on lead 128 to the next comparison circuit to assure that less significant digit comparison will not affect the final output signal.

Circuit 114, comprising pentode tubes 220 and 221, is operative to determine whether or not the preceding group of more significant digits of one of the input binary numbers contains an odd number of "ones." Circuit 114 is preceded by two more significant digit comparisons; viz, $a_1b_1$ and $a_2b_2$, and determines whether or not the $b_1$ and $b_2$ digits collectively contain an odd number of "ones." If $b_1$ is a "one," a negative voltage signal will be received in circuit 114 over lead 108 and impressed on the grid of tube 220 to cut off that tube. The same signal is inverted, as by an inverter 142, on lead 107 to impress a zero or positive signal on the grid of tube 230 causing tube 230 to conduct. If $b_2$ is also a "one," so that circuit 114 should indicate an even number of preceding "ones," a negative voltage signal will appear on lead 106 and be impressed on the grids 221 and 231 of tubes 220 and 230, respectively. Conducting tube 230 will now conduct through its screen grid 232, and a negative voltage signal will appear on "even" output lead 116 to the next such circuit 131.

If $b_2$ is a "zero" and $b_1$ is still a "one" so that circuit 114 should indicate the presence of an odd number of preceding "ones," a zero voltage is present on lead 106 and the grids 221 and 231 of tubes 220 and 230, thus allowing conduction through the plate circuit of tube 230 and thereby providing a negative voltage signal on odd output lead 117 to circuit 131. This negative voltage will also be impressed on the grids 212 and 215 of tubes 201 and 202 of circuit 120 over lead 118. If $b_1$ is a "zero," a zero or positive voltage signal appears on lead 108 and a negative voltage signal appears on lead 107 so that tube 220 will conduct and tube 230 is cut off. With a negative voltage "one" on lead 106 from dibit $b_2$ under these conditions, tube 220 will conduct through its screen grid 222 to provide a negative voltage signal on "odd" output lead 117. A "zero" on lead 106 will allow tube 220 to conduct to its plate to provide a negative voltage signal on "even" output lead 116.

Reference is made to my application Serial No. 581,-175, filed April 27, 1956, wherein a related invention is disclosed and claimed.

It is to be understood that the above described arrangements are illustrative of the application of the principles of the invention. Numerous other arrangements may be devised by those skilled in the art without departing from the spirit and scope of the invention.

What is claimed is:

1. An electrical circuit for comparing two binary code numbers comprising a logic circuit for each corresponding pair of digits of said numbers, first means applying signals representative of said digits simultaneously to said logic circuits, a pair of output leads from each of said logic circuits, an output circuit, means connecting one of said pair of output leads to said output circuit, means responsive to signals on the other of said output leads for blocking transmission of signals to said output circuit from said logic circuits receiving digit signals of lesser significance, and second means for applying signals to said logic circuits to reverse the signals on the output leads from said logic circuits on occurrence of an odd number of one type of binary digit in the digits of greater significance in one of said numbers.

2. An electrical circuit for comparing two binary code numbers comprising a logic circuit for each corresponding pair of digits of said numbers, said logic circuits each comprising a first and a second electron discharge device each having an anode and a cathode and a first, second and third grid element spaced therebetween, a separate output lead from the anode of each of said devices, said second grid element in each of said devices being connected to the anode of the opposite of said devices, an output circuit connected to one of said output leads, means applying signals representative of the digits of the same significance of said numbers to the first grid of one device and the cathode of the other device, and means for applying signals to said devices to reverse the signals on said output leads on occurrence of an odd number of one type of binary digit values in the digits of greater significance in said numbers.

3. An electrical circuit for comparing two binary code numbers comprising a logic circuit for each digit of said numbers, said logic circuit comprising a first and a second electron discharge device each having a cathode, an anode, and three grid elements interposed therebetween, a separate output lead from each of said anodes, means conncting the second grid of each device to the anode of the other device, an output circuit connected to one of said output leads, means applying signals representative of the digits of the same significance to the first grid of one device and the cathode of the other device, and means for applying signals to the third grid of said devices to reverse the output signals on said output leads.

4. An electrical circuit in accordance with claim 3 wherein said means for applying signals representative of the digits of said numbers includes a pair of cathode follower circuits, means connecting the control electrode of each cathode follower to the control electrode of one of said devices, and means for connecting the cathode of each cathode follower to the cathode of the other of said devices.

5. A system for comparing two binary code numbers in which digit values are characterized by one of two possible signals comprising output means, means for comparing each pair of digits of corresponding significance in said numbers each of said comparison means comprising logic means, means applying a first and second input signal to said logic means, said first input signal corresponding to the next more significant digit of a first one of said numbers, said second input signal representative of the odd or even number of like digit signals characterizing the digits of greater significance in said first number, said logic means providing an output signal corresponding to the sum of said first and second input signals and indicating an odd number of like digits in said first number, said comparison means responsive to receipt of unlike digit signals to apply an output signal to said output means indicative of the larger of said numbers, and means responsive to transmission of said comparison output signal to block the transmission of less significant digit comparison output signals to said output means, said comparison means further responsive to receipt of unlike digit signals plus said logic means output signal to reverse the normal output paths of said comparison output signals.

6. Apparatus for determining the larger of two multi-digit reflected binary code numbers comprising a plurality of digit comparison circuits, means for applying signals representing each pair of digits of the same significance in said numbers to individual of said digit comparison circuits, logic means associated with each of said digit comparison circuits, means for applying first and second input signals to said logic means, said first input signal corresponding to the next more significant digit of a first one of said numbers, said second input signal representative of the odd or even number of like digit signals characterizing the digits of more significance in said first number, means for effectively adding said first and second input signals in said logic means, means for applying the output of said logic means indicating an odd number of like digits to the associated comparison circuit, an output circuit, first means connecting each of said digit comparison circuits to said output circuit and second means connecting each of said digit comparison circuits to said first means connected to less significant digit comparison circuits, said associated comparison circuit responsive to receipt of unlike digit signals plus said logic means output signal to reverse the normal paths of output signals resulting from the unlike digit signal comparison.

7. Apparatus in accordance with claim 6 wherein said comparison circuits comprise first and second electron discharge devices each having an anode and cathode and first, second and third grid elements spaced therebetween, a separate output from the plate of each of said devices, said second grid element in each of said devices connected to the plate in the opposite one of said devices, means for applying one of said digit signals to said first grid element of one of said devices and to the cathode of the other of said devices, said one of said digit signals tending to reduce electron flow through one of said devices and to increase electron flow through the other of said devices, and an output of said logic means connected to said third grid element of each of said devices, said third grid elements responsive to said logic means output signal to block electron flow therethrough and direct said flow to said second grid elements.

8. Apparatus in accordance with claim 7 wherein said digit signal application means comprises first means for applying a digit signal of one polarity of one of said binary numbers to said first grid of said first discharge device and a signal of the same polarity to said cathode means of the second one of said discharge devices and second means for applying a digit signal of the other of said binary numbers of one polarity to said first grid of said second discharge device and a signal of the same polarity to said cathode means of said first discharge device.

9. A logic circuit comprising a first and a second electron discharge device each producing a distinct electron discharge and each having anode means, cathode means and a first, a second and a third grid inserted in that order between said cathode means and said anode means, said second grid in each of said discharge devices connected to said anode means of the other of said discharge devices, means for applying a first signal of one polarity to said first grid of one of said discharge means and for applying a signal of the same polarity to said cathode means of the other of said discharge means to reduce the anode current of said one of said discharge means and to increase the anode current of said other of said discharge means, and means for applying a second signal to said third grids, said third grids responsive to application of said second signal to divert electron flow in their respective discharge devices to said second grids.

10. A logic circuit in accordance with claim 9 wherein said third grids are commonly connected to said means applying said second signal.

11. A logic circuit in accordance with claim 10 wherein said first signal means comprises first means for applying a first signal of one polarity to said first grid of a first one of said discharge devices and for applying a signal of the same polarity to said cathode means of the second one of said discharge devices and second means for applying a first signal of one polarity to said first grid of said second discharge device and a signal of the same polarity to said cathode means of said first discharge device.

12. A logic circuit in accordance with claim 11 wherein said first and second means each comprise a cathode follower tube having plate means, cathode means and control electrode means, said control electrode means delivering said first signal of one polarity to the first grid of one of said electron discharge devices and said cathode means delivering said first signal of the same polarity to the cathode means of the other of said electron discharge devices.

13. In combination in a logic circuit a first and a second electron discharge device for producing a pair of distinct electron discharges, each having anode means, cathode means and a first, a second and a third grid inserted in that order in the path of discharge between said cathode means and said anode means, said second grid in each of said electron discharge devices connected to said anode means in the other of said electron discharge devices, first signal means coupled to said first grid of said first electron discharge means to apply a signal of one polarity and coupled to the cathode means of said second electron discharge device to apply a signal of the same polarity, second signal means coupled to said first grid of said second electron discharge device to apply a signal of one polarity and coupled to the cathode means of said first electron discharge device to apply a signal of the same polarity, third signal means coupled to each of said third grids whereby a signal from one of said first and said second signal means causes a change in one direction in the anode current of one of said electron discharge devices and a change in the opposite direction in the other of said electron discharge devices and a signal from said third signal means reverses the direction of change in the anode current of each of said electron discharge means.

14. A number comparison system arranged to receive a pair of equal length multiple digit reflected binary code numbers and comprising a plurality of digit comparison circuits arranged to compare pairs of digits of the same significance in said numbers, output means, means connecting said comparison means to said output means, said comparison means responsive to receipt of unlike digit signals representing digits of the same significance to transmit a selected one of a first and second signal to said connecting means, and a logic circuit associated with each of said comparison means and arranged to receive the next most significant digit signal of a first one of said numbers and third signals representative of the sum of odd and even numbers of digit signals of greater significance of said first number than said next most significant digit of said first number, said logic circuit responsive to receipt of said next most significant digit signal and said third signals to transmit an output signal to said associated comparison circuit when the sum of said next most significant digit signal and said third signal represents an odd number of like digit signals and said associated comparison circuit responsive to receipt of said logic circuit output signal to transmit the other of said first and second signals to said connecting means.

15. An electrical circuit for comparing two binary code numbers in which digit values are characterized by one of two possible signals comprising an output circuit, a plurality of logic circuit means each having a pair of output leads, means applying input signals representative of digits of equal significance to each of said logic circuit means, said output leads having distinctive and dissimilar signals thereon when said input signals are dissimilar and having logically no signal thereon when said input signals are alike, means for applying a third input signal to said logic circuit means dependent on the summation of digit values of the more significant digits of one of said numbers, said logic circuit means reversing the output signals on said output leads when said input signals are dissimilar and said third signal is present, means connecting one of said output leads to said output circuit, and means responsive to signals on the other of said output leads for blocking the transmission of signals from logic circuit means of less significant digits to said output circuit.

16. An electrical circuit in accordance with claim 15 wherein the condition of said output leads on occurrence of similar input signals to said logic circuit means corresponds to one of said output signals.

References Cited in the file of this patent

UNITED STATES PATENTS

| | | |
|---|---|---|
| 2,609,143 | Stilitz | Sept. 2, 1952 |
| 2,674,727 | Spielberg | Apr. 6, 1954 |
| 2,776,418 | Townsend | Jan. 1, 1957 |
| 2,784,397 | Branson et al. | Mar. 5, 1957 |
| 2,821,696 | Shiowitz et al. | Jan. 28, 1958 |
| 2,837,732 | Nelson | June 3, 1958 |
| 2,843,837 | Thaler et al. | July 15, 1958 |
| 2,844,309 | Ayres | July 22, 1958 |
| 2,877,445 | Cheilik | Mar. 10, 1959 |
| 2,884,616 | Fillebrown | Apr. 28, 1959 |
| 2,885,655 | Smoliar | May 5, 1959 |
| 2,923,476 | Ketchledge | Feb. 2, 1960 |